United States Patent [19]

Sugiyama et al.

[11] Patent Number: 4,786,793
[45] Date of Patent: Nov. 22, 1988

[54] CARD ACCESSING APPARATUS

[75] Inventors: Sadao Sugiyama, Shiga; Kazuo Tsuboi; Takeshi Ishida, both of Takatsuki, Japan

[73] Assignee: Omron Teteisi Electronics Co., Kyoto, Japan

[21] Appl. No.: 84,034

[22] Filed: Aug. 11, 1987

[30] Foreign Application Priority Data

Aug. 20, 1986 [JP] Japan .................................. 61-196348

[51] Int. Cl.⁴ .......................................... G06R 13/08
[52] U.S. Cl. ..................... 235/480; 235/477
[58] Field of Search ............................... 235/477, 480

[56] References Cited

U.S. PATENT DOCUMENTS 4,048,476 9/1977 Lawter ................................. 235/480

Primary Examiner—Harold I. Pitts
Attorney, Agent, or Firm—Stevens, Davis, Miller & Mosher

[57] ABSTRACT

A card accessing apparatus is provided which includes a slidable unit connected to a card holder and sliding in the width direction of the card holder, a reciprocating mechanism including a motor and an endless belt for reciprocating the card holder, and a connecting member for connecting the slidable unit to the endless belt. The motor is rotated only in one direction to rotate the endless belt which causes the slidable unit to reciprocate the card holder.

10 Claims, 2 Drawing Sheets

CARD ACCESSING APPARATUS

BACKGROUND OF THE INVENTION

1. Field of the Invention

This invention relates to a card accessing apparatus which employs a head to read or write data on a data storage area of a card, such as an optical card, magnetic card or the like, and more particularly, to an improved card accessing apparatus which reciprocates the card by rotating a motor only in one direction.

2. Discussion of the Related Art

A card accessing apparatus usually has a card holder which holds a card thereon, a guiding mechanism for supporting the card holder, a driving mechanism for reciprocating the card holder, and a head for reading or writing data on a data storage area of the card. The card holder is reciprocated by the driving mechanism, and the head is moved relatively with respect to the card holder to read or write data on the data storage area. The driving mechanism has a pair of pulleys, an endless belt disposed between the pulleys, and a motor which is connected to one of the pulleys. The motor is rotated in alternate directions to reciprocate the card holder which is connected to the belt at the upper portion thereof.

In the conventional apparatus, however, the changeover of the electric current to rotate the motor in alternate directions leads to a complicated control of the motor. The frequent reversal of the rotation direction also causes the brushes of the motor to be easily worn, shortening the life of the motor. Because the total time required for the frequent changes of the rotation direction of the motor is very long, high-speed data reading or writing is hindered. Moreover, a high-power motor for fast feeding of the card is required to achieve high-speed data reading or writing, which increases the size and cost of the apparatus.

SUMMARY OF THE INVENTION

It is, therefore, an object of this invention to provide a card accessing apparatus in which the motor is rotated only in one direction.

It is another object of this invention to provide a card accessing apparatus which is small-sized and allows highspeed data reading or writing.

According to this invention, there is provided a card accessing apparatus which includes (1) card holding means for holding a card, (2) guiding shaft means for supporting the card holder means such that the card holder means is reciprocated, (3) slidable means which is connected to a lower portion of the card holder means such that the slidable means slides in the width direction of the card holder means, (4) means for reciprocating the card holder, which is arranged under the card holder and includes a pair of pulley means, endless carrying means disposed between the pulley means and a motor which is connected to one of the pulley means and is rotated only in one direction, and (5) connecting means for connecting the slidable means to the endless carrying means. The structures are arranged such that the motor is driven in only one direction yet the card holding means travels in a reciprocal path.

BRIEF DESCRIPTION OF THE DRAWINGS

The above and other objects, advantages and features of this invention will be more fully understood from the following detailed description which is provided in conjunction with the following drawings, of which.

DETAILED DESCRIPTION OF THE INVENTION

Figure 1:
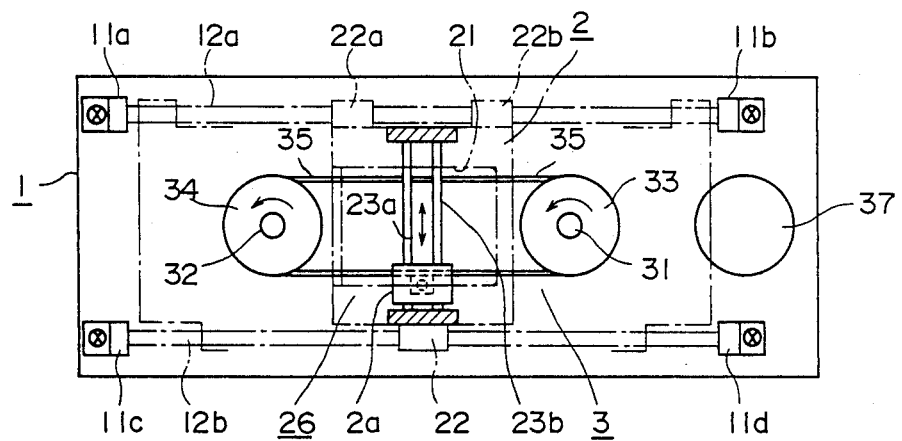
FIG. 1 is a plan view of a preferred embodiment of the invention.

FIGS. 1 to 4 show a card accessing apparatus according to a preferred embodiment of the invention. Supporting members 11a, 11b, 11c and 11d are disposed on a base 1. A guiding shaft 12a is disposed between the supporting members 11a and 11b, and another guiding shaft 12b, parallel to the guiding shaft 12a, is disposed between the supporting members 11c and 11d. A card holder 2 which has a card holding portion 21 thereon is supported by the guiding shafts 12a and 12b such that the card holder 2 is reciprocable along the shafts 12a and 12b. In addition, the holder 2 has a housing 2a which is fixed to the lower portion of the holder 2 for housing a slider 24 described hereinafter. A slidable unit 26 is connected to the card holder 2 at the lower portion of the holder 2 such that the slidable unit 26 slides in the width direction of the holder 2. A unit 3 for reciprocating the card holder 2 is arranged under the card holder 2.

The slidable unit 26 has a pair of guiding shafts 23a and 23b which are extended in the width direction of the card holder 2, and a slider 24 which is slidably mounted on the shafts 23a and 23b and fixed to the housing 2a. The slider 24 may be slidably mounted on only one guiding shaft, if desired.

The reciprocating unit 3 has two rotatable shafts 31 and 32 which are disposed on the base 1. Pulleys 33 and 34 are mounted on the shafts 31 and 32, respectively, and a pulley 40 is mounted on the other end of the shaft 31. Disposed between the pulleys 33 and 34 is an endless belt 35. A motor 37 which is rotated only in one direction has an output shaft 37a and a pulley 37b which is mounted on the output shaft 37a. The shaft 31 is connected to the motor 37 with a belt 36 disposed between the pulleys 40 and 37b.

Figure 4:
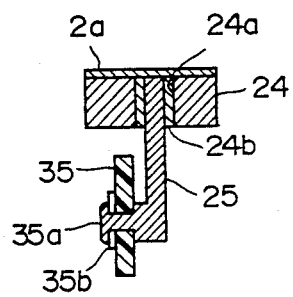
FIG. 4 is an enlarged section view of a joint portion taken along a line A—A in FIG. 2.

FIG. 4 shows an enlarged sectional view of a joint portion between the slider 24 of the slidable unit 26 and the belt 35 of the reciprocating unit 3. As shown in FIG. 4, the slider 24 has a through-hole 24a into which a bearing 24b is fitted. One end of a connecting pin 25 is rotatably supported by the bearing 24b. The other end of the pin 25 is fitted through an opening 35a of the belt 35 and fixed to the belt 35 via a washer 35b by deforming the tip thereof.

Figure 5:
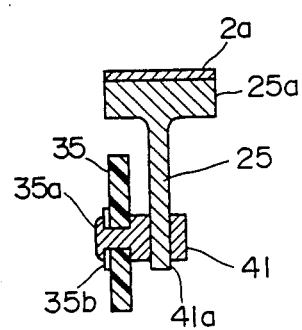
FIG. 5 is an enlarged sectional view of another form of the joint portion.

FIG. 5 shows another form of the joint portion. In FIG. 5, a connecting member 41 having a through-hole 41a is fitted through the opening 35a and fixed to the belt 35 via the washer 35b by deforming the tip thereof. One end of the pin 25 is rotatably inserted into the hole 41a and the other end, that is, the base 25a, is fixed to the housing 2a of the card holder 2.

Figure 2:
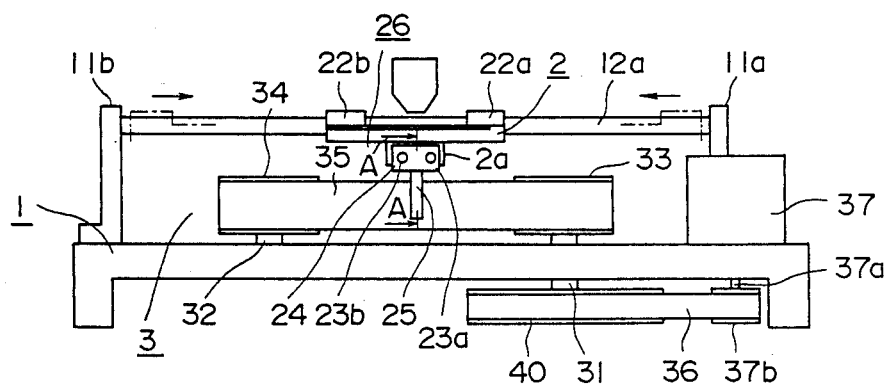
FIG. 2 is a front view of FIG. 1.
Figure 3:
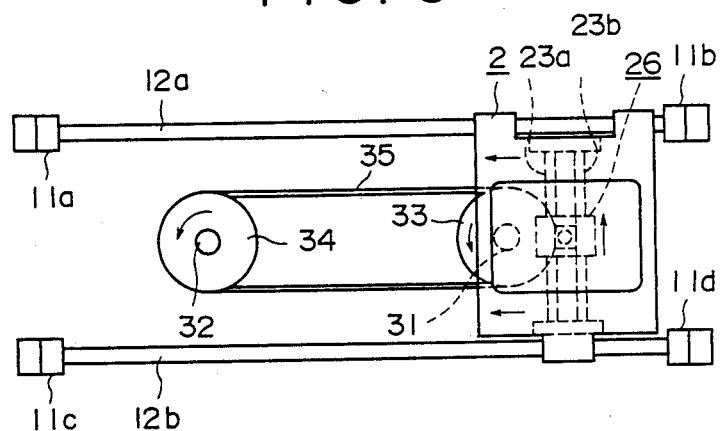
FIG. 3 is a plan view for illustrating the operation of the apparatusof FIG. 1.

The operation of the card accessing apparatus shown in FIGS. 1-2 will be described hereinafter referring to FIG. 3. When the motor is rotated to move the belt 35, the card holder 2 is moved along the guiding shafts 12a and 12b via the slidable unit 26 connected between the belt 35 and the holder 2.

When the slidable unit 26 reaches the circumference of the pulley 31, the slidable unit 26 slides in the width direction of the holder 2 along the guiding shafts 23a and 23b and reaches a point opposing the start point of the sliding, while the unit 26 goes half way around the pulley 31. Then, the card holder 2 is moved in the opposite direction via the slidable unit 26 by the motor 37.

Since the motor 37 is rotated only in one direction, the brushes of the motor 37 are subject to less wear and the vibration of the apparatus caused by reversing the rotation direction of the motor 37 is eliminated, increasing the durability of the apparatus. In addition, since additional time for reversing the rotation direction of the motor 37 is not required, high-speed data reading or writing can be achieved and the motor 37 can be made small.

A sufficient stroke of the card holder 2 is provided even if the distance between the pulleys 33 and 34 is short, because the movement of the card holder 2 is not hindered by the pulleys 33 and 34. In the FIGS. 1-3 embodiment, the slidable unit 26 is supported by the guiding shafts 23a and 23b, but alternatively, it may be supported by a bush bearing or a ball bearing.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

We claim:

1. A card accessing apparatus, comprising:
   card holding means for holding a card;
   guiding shaft means for supporting said card holder means such that said card holder means is reciprocable along said shaft means;
   slidable means, which is connected to said card holder means at the lower portion thereof, for sliding in the width direction of said card holder means;
   means for reciprocating said card holder, which comprises a pair of rotatable members, endless carrying means reeved around said rotatable members, and a motor which is coupled to one of said rotatable member and is rotated only in one direction; and
   connecting means for connecting said slidable means to said endless carrying means.

2. The apparatus as in claim 1, wherein said pair of rotatable members is a pair of pulleys and said endless carrying means is a belt reeved around said pulleys.

3. The apparatus as in claim 1, wherein said connecting means is a pin.

4. The apparatus as in claim 3, wherein said slidable means includes at least one guiding shaft which is extended in the width direction of said card holder, a slider which is slidably mounted on said guiding shaft and has an opening, and a bush bearing fitted into said opening.

5. The apparatus as in claim 4, wherein said endless carrying means is an endless belt which has a throughhole cooperating with said connecting means.

6. The apparatus as in claim 1, wherein said endless carrying means is an endless belt which has a throughhole cooperating with said connecting means.

7. The apparatus as in claim 5, wherein one end of said pin is fixed to said endless belt through said throughhole of said endless belt, and the other end of said pin is rotatably supported by said bush bearing.

8. The apparatus as in claim 2, wherein said pair of pulleys are horizontally disposed under said card holder means.

9. The apparatus as in claim 1, wherein said slidable means includes at lease one guiding shaft which is extended in the width direction of said card holder means, and a slider which is slidably mounted on said guiding shaft.

10. The apparatus as in claim 9, wherein said slidable means includes a pair of guiding shafts which are extended in the width direction of said card holder means, and said slider is slidably mounted on said pair of guiding shafts.

* * * * *